(12) United States Patent
Ahn

(10) Patent No.: US 11,888,133 B2
(45) Date of Patent: Jan. 30, 2024

(54) BATTERY MODULE COOLING STRUCTURE

(71) Applicant: HYUNDAI MOBIS Co., Ltd., Seoul (KR)

(72) Inventor: Ki Hoon Ahn, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 108 days.

(21) Appl. No.: 17/556,476

(22) Filed: Dec. 20, 2021

(65) Prior Publication Data
US 2022/0209323 A1 Jun. 30, 2022

(30) Foreign Application Priority Data
Dec. 28, 2020 (KR) .................... 10-2020-0185282

(51) Int. Cl.
*H01M 10/625* (2014.01)
*H01M 10/6556* (2014.01)
*H01M 10/6567* (2014.01)

(52) U.S. Cl.
CPC ..... *H01M 10/625* (2015.04); *H01M 10/6556* (2015.04); *H01M 10/6567* (2015.04)

(58) Field of Classification Search
CPC ........... H01M 10/625; H01M 10/6556; H01M 10/6567; H01M 2220/20; H01M 10/613; H01M 50/249; F28F 2215/06; F28F 2215/08; F28F 2225/06; F28F 2230/00; F28F 2240/00; F28F 2245/02; F28F 2250/04; F28F 2250/06; F28F 2255/14; F28F 2265/14; F28F 2265/16; F28F 2265/22; F28F 2265/28; F28F 2270/00; F28F 2275/025; F28F 2275/04; F28F 2275/20; F28F 2280/10; F28F 3/083; F28F 3/086; F28F 7/00; F28F 9/0202;
(Continued)

(56) References Cited

U.S. PATENT DOCUMENTS 11,724,606 B2 * 8/2023 Fan ..................... H01M 50/342
429/7
11,764,418 B2 * 9/2023 Cheon ............... H01M 10/6567
429/120
(Continued)

FOREIGN PATENT DOCUMENTS

CN 104868183 A * 8/2015 ............. B60L 50/16
CN 110635199 A * 12/2019 .......... H01M 10/625
(Continued)

*Primary Examiner* — Kaity V Chandler
(74) *Attorney, Agent, or Firm* — NSIP Law

(57) ABSTRACT

A battery module cooling structure includes: a battery module fixed to a vehicle body; and a cooling block disposed under the battery module and configured to reduce heat generated by the battery module. The cooling block includes: an upper panel closing an upper portion of the cooling block, the upper panel having corner regions including an inlet hole configured to take in cooling water and an outlet hole configured to discharge the cooling water; a lower panel spaced downward from the upper panel and closing a lower portion of the cooling block; an inlet pipe coupled to an upper portion of the upper panel, and configured to take in the cooling water; and an outlet pipe coupled
(Continued)

to the upper portion of the upper panel at a position spaced apart from the inlet pipe, and configured to discharge the cooling water.

13 Claims, 3 Drawing Sheets

(58) Field of Classification Search
CPC ...... F28F 9/0234; F28F 9/0248; F28F 9/0273; F28F 9/18; F28F 9/182; F28C 1/00; F28C 1/02; F28C 1/04; F28C 1/14; F28C 1/003; F28C 1/16; F28C 2001/006; F28C 3/06; F28C 3/08; F28C 1/06; F28C 1/10; F28C 1/12; F28C 3/00; F28D 1/05391; F28D 9/00; F28D 15/0233; F28D 1/05366; F28D 15/02; F28D 9/005; F28D 21/00; F28D 2021/0085; F28D 1/022; F28D 9/02; F28D 1/0443; F28D 15/0266; F28D 9/0043; F28D 15/0208; F28D 2021/0024; F28D 2021/0071; F28D 9/0037; F28D 9/0093; F28D 9/04; F28D 1/05375

See application file for complete search history.

(56) References Cited

U.S. PATENT DOCUMENTS

| | | | | |
|---|---|---|---|---|
| 2016/0036104 | A1* | 2/2016 | Kenney | F28F 3/12 165/170 |
| 2017/0324132 | A1* | 11/2017 | Kenney | H01M 50/24 |
| 2019/0366876 | A1* | 12/2019 | Cheadle | B60L 58/27 |
| 2020/0161721 | A1* | 5/2020 | Wang | H01M 10/6567 |
| 2022/0166087 | A1* | 5/2022 | Lim | H01M 50/249 |

FOREIGN PATENT DOCUMENTS

| | | | | | |
|---|---|---|---|---|---|
| CN | 112002841 | A | * | 11/2020 | .......... H01M 10/613 |
| CN | 109149009 | B | * | 4/2021 | .......... H01M 10/613 |
| CN | 113140824 | A | * | 7/2021 | .......... H01M 10/486 |
| CN | 113178640 | A | * | 7/2021 | .......... H01M 10/613 |
| KR | 20180010301 | A | * | 1/2018 | ........ H01M 2220/20 |
| WO | WO-2013073463 | A1 | * | 5/2013 | ............... B60K 1/04 |
| WO | WO-2021045084 | A1 | * | 3/2021 | ......... F28D 1/05358 |

* cited by examiner

BATTERY MODULE COOLING STRUCTURE

CROSS-REFERENCE TO RELATED APPLICATIONS

This application claims the benefit under 35 USC § 119(a) of Korean Patent Application No. 10-2020-0185282, filed on Dec. 28, 2020 in the Korean Intellectual Property Office, the entire disclosure of which is incorporated herein by reference for all purposes.

BACKGROUND

1. Technical Field

This disclosure relates to a battery module cooling structure, and more specifically, to a battery module cooling structure which uniformly cools heat generated by a battery module.

2. Discussion of Related Art

Recently, as interest in environmental protection increases, instead of development of internal combustion engine vehicles using conventional combustion engines, development of other type vehicles that are environmentally friendly and fuel-efficient, that is, hybrid vehicles and electric vehicles, is being actively conducted.

Since a hybrid vehicle is driven using two power sources in which a conventional engine and a motor, which is driven using electrical energy, are linked, the hybrid vehicle is positioned as an alternative next-generation vehicle which has been spotlighted recently in the United States, Japan, and Europe due to effects of reducing environmental pollution caused by exhaust gas and improving fuel efficiency.

Generally, in a hybrid vehicle, an engine driven by gasoline and diesel and used as a main power source and a motor used as auxiliary power source are used, and the hybrid vehicle travels using the engine as a power source at predetermined speed or more and travels using the motor as a power source when traveling at a lower speed.

In addition, in an electric vehicle, a motor is mainly used as a main power source.

Meanwhile, a high voltage battery module is used as a power source required for driving a motor, and the high voltage battery module acts as an important factor related to a lifetime of a hybrid vehicle and an electric vehicle.

Accordingly, a battery should be managed thoroughly in order to efficiently operate the battery.

However, when the conventional battery is used for a long time, heat is generated, and particularly, in the case of a high-capacity battery, since an amount of current increases when the battery is charged or discharged, more heat is generated In this case, when the generated heat is not removed sufficiently, the performance of the battery may be degraded, or furthermore, the battery may also catch fire or explode.

Accordingly, the battery should be essentially cooled in order to maintain and improve the performance of the battery.

That is, a battery cooling system is used in an eco-friendly vehicle in order to ensure a lifetime and the performance of a battery installed in the eco-friendly vehicles.

Such a battery cooling system is divided into an air cooling type battery cooling system using air, a water cooling type battery cooling system using cooling water, or a coolant cooling type battery cooling system using a coolant.

In addition, factors affecting the heat dissipation performance may be divided into external factors, such as air, cooling water, and a coolant as described above, and internal factors related to a heat dissipation structure of a battery cooling apparatus.

Meanwhile, the conventional method of cooling a battery is focused on a technology related to the internal factors such as a contact area of a heating body, that is, a battery, and a distribution of a flow rate.

However, since there are limitations in performance of cooling water, a driving motor, and the like, a method of minimizing internal pressure drop of components is emerging.

That is, by minimizing the internal pressure drop, a flow rate of cooling water may increase, and thus the heat dissipation performance of the battery cooling apparatus may be improved.

Meanwhile, recently, in order to increase a mileage of an electric vehicle and to reduce a fast charging time, it is necessary to additionally apply a plurality of high capacity cells, and thus an amount of heat generated by a battery increases.

However, although the amount of heat of the battery increases, due to a limitation in an output of a cooling water driving motor of a vehicle, there is a problem in that it is difficult to secure the heat dissipation performance of a battery cooling apparatus using a level of a currently applied flow rate.

Accordingly, it is necessary to achieve improvement against the external factors through pressure drop reduction beyond the internal factor of a water cooling path.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a battery module cooling structure includes: a battery module fixed to a vehicle body; and a cooling block disposed under the battery module and configured to reduce heat generated by the battery module. The cooling block includes: an upper panel closing an upper portion of the cooling block, the upper panel having corner regions including an inlet hole configured to take in cooling water and an outlet hole configured to discharge the cooling water; a lower panel spaced downward from the upper panel and closing a lower portion of the cooling block; an inlet pipe coupled to an upper portion of the upper panel, and configured to take in the cooling water; and an outlet pipe coupled to the upper portion of the upper panel at a position spaced apart from the inlet pipe, and configured to discharge the cooling water.

The inlet hole may be in fluid communication with the inlet pipe. The outlet hole may be in fluid communication with the outlet pipe.

The upper panel may include: a first region between one end of the upper panel and the inlet hole; and a second region between another end of the upper panel and the inlet hole.

A length of the first region may be less than a length of the second region.

The lower panel may include: first and second coupling parts coupled to a lower surface of the upper panel in the first region and the second region, respectively; first and second inclined parts extending to be inclined downward from the first and second coupling parts, respectively a horizontal part connecting the first and second inclined parts to each other; an accommodation space disposed between the horizontal part and the upper panel, and configured to allow the cooling water to flow therethrough; and a backflow prevention part formed between the inlet hole and the first coupling part.

A length of the backflow prevention part may be in a range of 45% to 50% of a lateral length of the inclined part.

The first and second inclined parts may be inclined from the first and second coupling parts, respectively, in a range of 35 degrees to 40 degrees.

A length of the horizontal part may be in a range of 65% to 70% of a lateral length of the lower panel excluding the first and second coupling parts.

The cooling block may further include a leakage blocking member disposed between the inlet hole and the inlet pipe.

Other features and aspects will be apparent from the following detailed description, the drawings, and the claims.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
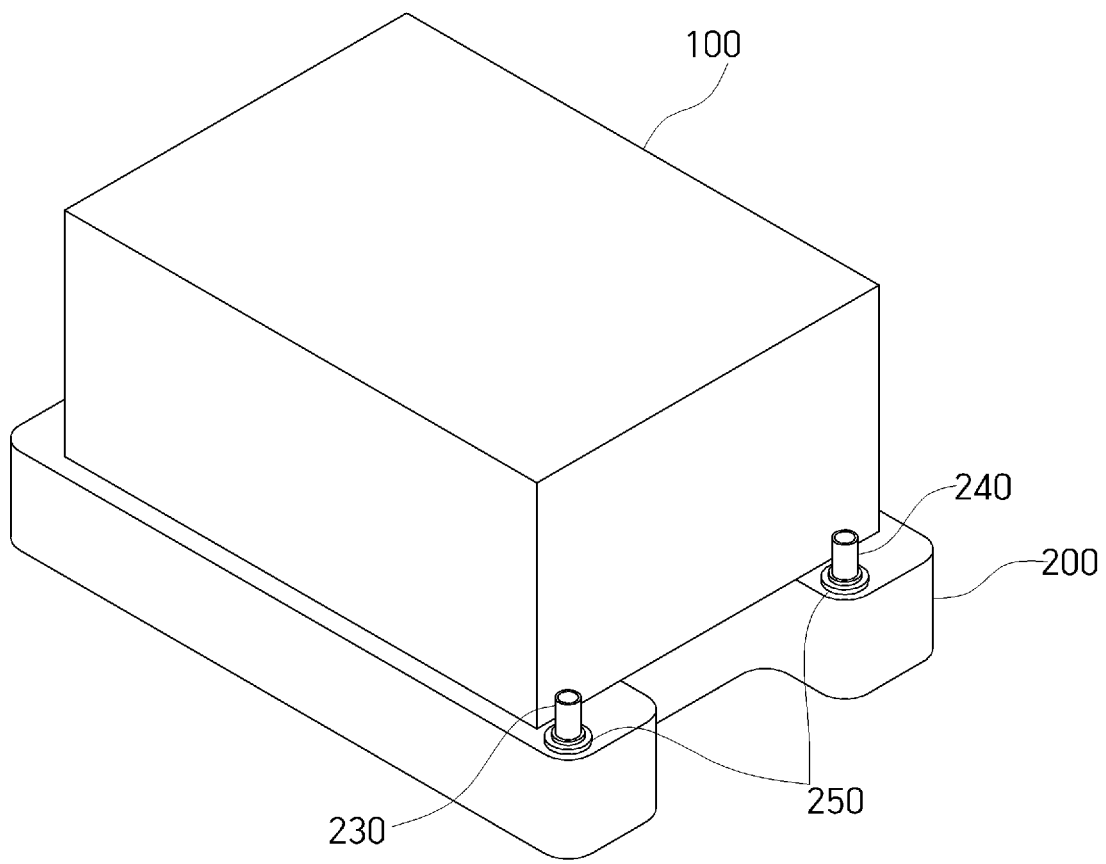
FIG. 1 is a perspective view illustrating a battery module cooling structure according to one embodiment of the present invention.

Embodiments of the present invention are provided to more completely describe the present invention to those skilled in the art, the embodiments described below will be changed into various different forms, and the scope of the present invention is not limited to the following embodiments. Further, the embodiments are provided to make the present invention more complete and true and to convey the spirit of the present invention to those skilled in the art. In addition, in the accompanying drawings, components are exaggerated for convenience and clarity of descriptions, and components that are the same are referred to by the same reference numerals. As used in the present specification, the term "and/or" includes any and all combinations of the associated listed items.

The terms used herein are used only to describe the specific embodiments and are not to limit the present invention.

Unless the context clearly indicates otherwise, the singular forms described in the specification include the plural forms. In addition, the terms "comprise" and "comprising," when used herein, specify some stated shapes, numbers, steps, operations, members, elements, and/or presence of groups thereof but do not preclude one or more other shapes, numbers, operations, members, elements, and/or presence or addition of groups thereof.

Hereinafter, exemplary embodiments of the present invention will be described in detail with reference to the accompanying drawings.

Figure 2:
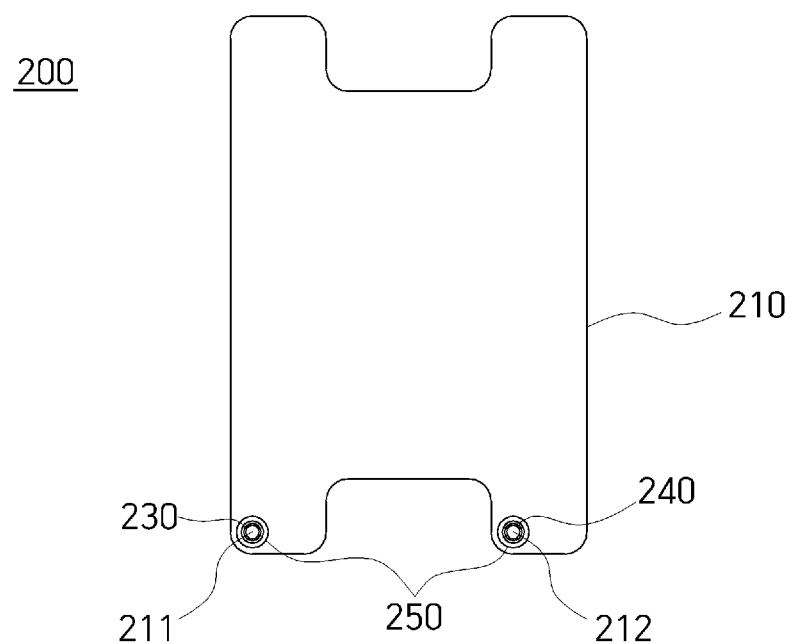
FIG. 2 is a plan view illustrating the battery module cooling structure according to one embodiment of the present invention.
Figure 3:
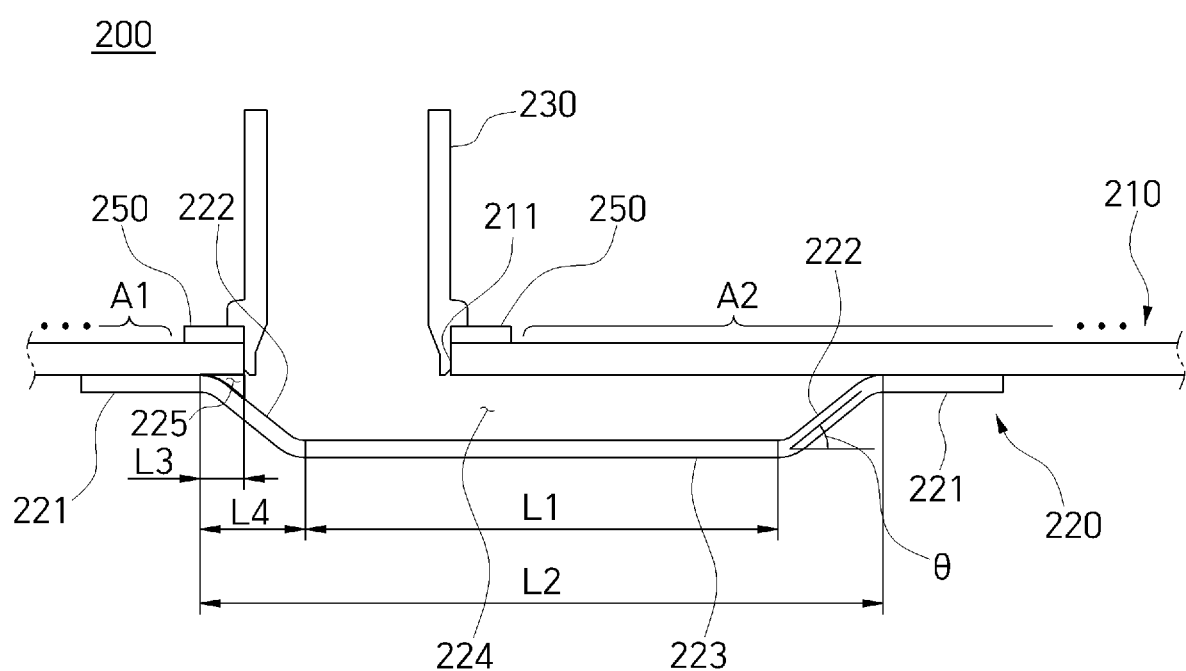
FIG. 3 is a cross-sectional view illustrating a cross section of the battery module cooling structure according to one embodiment of the present invention.

FIG. 1 is a perspective view illustrating a battery module cooling structure according to one embodiment of the present invention, FIG. 2 is a plan view illustrating the battery module cooling structure according to one embodiment of the present invention, and FIG. 3 is a cross-sectional view illustrating a cross section of the battery module cooling structure according to one embodiment of the present invention.

Referring to FIGS. 1 to 3, a cooling structure of a battery module 100 according to one embodiment of the present invention includes the battery module 100 and a cooling block 200.

The battery module 100 is provided as a plurality of battery modules 100, includes a plurality of battery cells and a cover member, in which the battery cells are accommodated, and is fixed to a vehicle body.

The battery module 100 stores power to be supplied to a high voltage battery system.

The plurality of battery modules 100 are arranged in a horizontal direction.

Meanwhile, the battery cell of the present invention may be manufactured as one of various types and may be manufactured as a pouch type preferably.

In the pouch type battery cell, since a flexible aluminum laminate sheet is used as an exterior member, the pouch type battery cell is formed in a form which is easily bent.

Since a shape of the pouch type battery cell may be relatively freely formed, and the pouch type battery cell is lightweight, the pouch type battery cell is mainly used in the battery module 100 for a vehicle in which a plurality of battery cells should be provided.

The cooling block 200 is disposed under the plurality of battery modules 100 and cools heat of the battery modules 100.

To this end, cooling water for cooling the battery module 100 is introduced into the cooling block 200.

The cooling water flows in the cooling block 200, and the cooling block 200 absorbs heat of the battery cell generated when a water cooling type battery module is charged or discharged.

The cooling block 200 includes an upper panel 210, a lower panel 220, an inlet pipe 230, an outlet pipe 240, and a leakage blocking member 250.

The upper panel 210 is a panel formed in a quadrangular shape, constitutes a body of an upper region of the cooling block 200, and closes an upper portion of the cooling block 200.

An inlet hole 211 and an outlet hole 212 are formed in the upper panel 210.

The inlet hole 211 is a hole through which cooling water is externally introduced.

The inlet hole 211 is formed in a corner region of the upper panel 210.

That is, when the cooling water is introduced through the inlet hole 211, the cooling water flows in a direction opposite to the corner region.

Meanwhile, the upper panel 210 includes a first region A1 between one end which is a region present in a direction toward a corner and the inlet hole 211 and a second region A2 between the other end present in a direction opposite to the one end with respect to the inlet hole 211 and the inlet hole 211.

That is, the inlet hole 211 is formed between the first region A1 present in a direction toward one end, that is, toward a corner, in the upper panel 210 and the second region A2 present in a direction toward the other end in the upper panel 210.

In addition, a length of the first region A1 is smaller than a length of the second region A2.

That is, the first region A1 is the corner region of the upper panel 210.

The outlet hole 212 allows the cooling water to be discharged after the cooling water, which is introduced through the inlet hole 211, flows in the cooling block 200 to cool the battery module 100.

The outlet hole 212 may be disposed in the corner region of the upper panel 210 like the inlet hole 211.

Meanwhile, the inlet hole 211 and the outlet hole 212 are formed in regions which do not overlap the battery module 100 disposed on the cooling block 200.

Accordingly, the inlet hole 211 may allow the cooling water to be easily externally introduced, and the outlet hole 212 may allow the cooling water to be easily discharged.

The lower panel 220 is a panel spaced downward from the upper panel 210 and constitutes a body of a lower region of the cooling block 200 and closes a lower portion of the cooling block 200.

The lower panel 220 includes coupling parts 221, inclined parts 222, a horizontal part 223, an accommodation space 224, and a backflow prevention part 225.

The coupling part 221 is a part having a predetermined area and is in contact with a lower surface of the upper panel 210 so that the lower panel 220 is fixed to the upper panel 210.

That is, the coupling part 221 is formed as a pair of coupling parts 221 when a cross-section thereof is viewed as illustrated in FIG. 3 and coupled to the first region A1 and the second region A2 on the lower surface of the upper panel 210.

The coupling part 221 may be coupled to the upper panel 210 in a welding manner.

Accordingly, the cooling water introduced into the cooling block 200 may be effectively blocked from leaking to the outside of the cooling block 200.

Meanwhile, the inlet hole 211 formed in the upper panel 210 is formed in the corner region as described above.

Accordingly, since the first region A1 is a region overlapping the corner region of the upper panel 210, a distance between the inlet hole 211 and the coupling part 221 coupled to the first region A1 is smaller than a distance between the inlet hole 211 and the coupling part 221 coupled to the second region A2.

The inclined parts 222 extend to be inclined downward from end portions of the pair of coupling parts 221 in the facing directions.

An angle θ of the inclined part 222 is 40 degrees or less and may range from 35 degrees to 40 degrees preferably.

Accordingly, the horizontal part 223 coupled to a lower end portion of the inclined part 222 may be spaced a distance from the lower surface of the upper panel 210.

Particularly, since a distance between the inclined part 222, which extends from the coupling part 221 coupled to the first region A1, of the inclined parts 222 and the inlet hole 211 is short, an overall shape from the inlet hole 211 to the second region A2 of the accommodation space 224 is an "L" shape.

Accordingly, in the present invention in which the distance between the inclined part 222, which extends from the coupling part 221 coupled to the first region A1, of the inclined parts 222 and the inlet hole 211 is short, the cooling water is blocked from flowing in a direction toward the first region A1, and the cooling water flows in a direction toward only the second region A2 so that an inflow direction of the cooling water may be effectively prevented from being divided.

Accordingly, since pressure drop of the cooling water introduced into the cooling block 200 is minimized to about 5%, a flow rate of the cooling water in the cooling block 200 may increase, and heat generated by the battery module 100 may be uniformly cooled so that the heat dissipation performance of a battery cooling apparatus may be improved.

The horizontal part 223 is a part connecting the pair of inclined parts 222 and is spaced apart from the lower surface of the upper panel 210 due to the inclined parts 222.

Accordingly, by connecting the horizontal part 223 and the coupling parts 221 through the inclined parts 222 inclined downward, a space between the upper panel 210 and the horizontal part 223 may be closed to form the accommodation space 224 between the horizontal part 223 and the upper panel 210.

The accommodation space 224 is a space which is formed between the horizontal part 223 and the upper panel 210, to which the cooling water is externally introduced, and in which the cooling water flows.

A length L1 of the horizontal part 223 is about 70% or less of a lateral length L2 of a part excluding the coupling part 221 from the entire lower panel 220 and may range from 65% to 70% thereof preferably.

Since the cooling water is introduced into the accommodation space 224 constituting the cooling block 200, the battery module 100 disposed on the cooling block 200 can be effectively cooled.

The backflow prevention part 225 is formed between the coupling part 221 coupled to the first region A1 and the inlet hole 211.

Specifically, the backflow prevention part 225 denotes a space between a start of the inclined part 222, which extends from the end portion of the coupling part 221 coupled to the first region A1, and the upper panel 210.

Meanwhile, a length L3 of the backflow prevention part 225 is 50% or less of a lateral length L4 of the inclined part 222 extending downward and may range from 45% to 50% thereof preferably.

That is, the length L3 of the backflow prevention part 225 is smaller than the lateral length L4 of the inclined part 222.

Accordingly, the inclined part 222 formed in the first region A1 may prevent the cooling water introduced into the accommodation space 224 through the inlet hole 211 from flowing in the direction toward the first region A1, and the backflow prevention part 225 may effectively prevent the cooling water from spattering to the inlet hole 211 after the cooling water comes into contact with the horizontal part 223 and the inclined part 222.

The inlet pipe 230 is formed in a hollow pipe shape, is coupled to an upper portion of the upper panel 210, and allows the cooling water to flow to the accommodation space 224.

The inlet pipe 230 communicates with the inlet hole 211 formed in the upper panel 210.

Accordingly, the inlet pipe 230 may allow the cooling water to easily flow to the accommodation space 224 of the cooling block 200.

The outlet pipe 240 is formed in a hollow pipe shape and coupled to an upper portion of the upper panel 210 at a position spaced apart from inlet pipe 230.

In addition, the outlet pipe 240 allows the cooling water, which is introduced through the inlet pipe 230, flows in the accommodation space 224, and cools the battery module 100, to be discharged.

The outlet pipe 240 communicates with the outlet hole 212 formed in the upper panel 210.

The leakage blocking member 250 is a member formed of an elastic material and blocks the cooling water from leaking through the inlet hole 211 or the outlet hole 212.

To this end, a flange part may be formed on a circumference of each of the inlet pipe 230 and the outlet pipe 240.

In addition, a lower surface of the leakage blocking member 250 is in contact with an upper surface of the upper panel 210, and an upper surface of the leakage blocking member 250 is in contact with a lower surface of the flange part of each of the inlet pipe 230 and the outlet pipe 240.

Accordingly, when the inlet pipe 230 and the outlet pipe 240 are coupled to the inlet hole 211 and the outlet hole 212, respectively, since the flange part of each of the inlet pipe 230 and the outlet pipe 240 elastically presses the leakage blocking member 250, the cooling water may be effectively prevented from leaking through the inlet hole 211 and the outlet hole 212.

As described above, in the cooling structure of the battery module 100 according to the present invention, since the distance between the inclined part 222, which extends from the coupling part 221 coupled to the first region A1, of the inclined parts 222 and the inlet hole 211 is short, the overall shape from the inlet hole 211 to the second region A2 of the accommodation space 224 is the "L" shape, the cooling water is blocked from flowing in the direction toward the first region A1, and the cooling water is introduced in the direction toward only the second region A2 so that the inflow direction of the cooling water may be effectively prevented from being divided.

Accordingly, since the pressure drop of the cooling water introduced into the cooling block 200 is minimized to about 5%, the flow rate of the cooling water in the cooling block 200 may increase, and the heat generated by the battery module 100 may be uniformly cooled so that the heat dissipation performance of the battery cooling apparatus may be improved.

In addition, since the length L3 of the backflow prevention part 225 is 50% or less of the lateral length L4 of the inclined part 222, the inclined part 222 formed in the first region A1 may prevent the cooling water introduced into the accommodation space 224 through the inlet hole 211 from flowing in the direction toward the first region A1, and the backflow prevention part 225 may effectively prevent the cooling water from spattering to the inlet hole 211 after the cooling water comes into contact with the horizontal part 223 and the inclined part 222.

According to the present invention, since a distance between an inclined part, which extends from a coupling part coupled to a first region A1, of inclined parts and an inlet hole is short, an overall shape from the inlet hole to a second region A2 of an accommodation space is an "L" shape, cooling water is blocked from flowing in a direction toward the first region A1 and only flows to the second region A2, and thus there is a an effect of effectively preventing an inflow direction of the cooling water from being divided.

Accordingly, since a pressure drop of the cooling water introduced into a cooling block is minimized to about 5%, a flow rate of the cooling water in the cooling block can increase, heat generated by a battery module can be uniformly cooled, and thus there is an effect in that the heat dissipation performance of a battery cooling apparatus can be improved.

In addition, since a length of a backflow prevention part is 50% or less of a lateral length of the inclined part, there are effects in that the inclined part formed in the first region A1 can prevent the cooling water introduced into the accommodation space through the inlet hole from flowing in the direction toward the first region A1, and the backflow prevention part can effectively prevent the cooling water from spattering to the inlet hole after the cooling water comes into contact with the horizontal part and the inclined part.

As described above, the embodiment disclosed in the present specification should be considered in a descriptive sense only and not for purposes of limitation, the scope of the present invention is defined not by the above description but by the appended claims, and it should be interpreted that the scope of the present invention encompasses all differences falling within equivalents of the appended claims.

What is claimed is:

1. A battery module cooling structure, comprising:
   a battery module fixed to a vehicle body; and
   a cooling block disposed under the battery module and configured to reduce heat generated by the battery module, the cooling block including:
   an upper panel closing an upper portion of the cooling block, the upper panel having a first corner region including an inlet hole configured to take in cooling water and a second corner region including an outlet hole configured to discharge the cooling water, wherein the upper panel includes:
   a first region between one end of the upper panel and the inlet hole; and
   a second region between another end of the upper panel and the inlet hole, wherein a length of the first region is less than a length of the second region;
   a lower panel spaced downward from the upper panel and closing a lower portion of the cooling block, wherein the lower panel includes:
   first and second coupling parts coupled to a lower surface of the upper panel in the first region and the second region, respectively;
   first and second inclined parts extending to be inclined downward from the first and second coupling parts, respectively;
   a horizontal part connecting the first and second inclined parts to each other;
   an inlet pipe coupled to an upper portion of the upper panel, and configured to take in the cooling water; and
   an outlet pipe coupled to the upper portion of the upper panel at a position spaced apart from the inlet pipe, and configured to discharge the cooling water.

2. The battery module cooling structure of claim 1, wherein:
   the inlet hole is in fluid communication with the inlet pipe; and
   the outlet hole is in fluid communication with the outlet pipe.

3. The battery module cooling structure of claim 1, wherein the lower panel includes:
   an accommodation space disposed between the horizontal part and the upper panel, and configured to allow the cooling water to flow therethrough; and
   a backflow prevention part formed between the inlet hole and the first coupling part.

4. The battery module cooling structure of claim 3, wherein a length of the backflow prevention part is in a range of 45% to 50% of a lateral length of the first inclined part.

5. The battery module cooling structure of claim 3, wherein the first and second inclined parts are inclined from the first and second coupling parts, respectively, in a range of 35 degrees to 40 degrees.

6. The battery module cooling structure of claim 3, wherein a length of the horizontal part is in a range of 65% to 70% of a lateral length of the lower panel excluding the first and second coupling parts.

7. The battery module cooling structure of claim 1, wherein the cooling block further includes a leakage blocking member disposed between the inlet hole and the inlet pipe.

8. An apparatus, comprising:
an upper panel, wherein the upper panel includes:
a first region between one end of the upper panel and an inlet hole; and
a second region between another end of the upper panel and the inlet hole, wherein a length of the first region is less than a length of the second region;
a lower panel joined to the upper panel to form an accommodation space with the upper panel, the lower panel comprising:
inclined portions extending from the lower panel to the upper panel;
first and second coupling parts coupled to a lower surface of the upper panel in the first region and the second region, respectively;
first and second inclined parts extending to be inclined downward from the first and second coupling parts, respectively;
a horizontal part connecting the first and second inclined parts to each other;
an inlet pipe coupled to an upper portion of the upper panel at a first position overlapping a corner region of the upper panel, wherein a first distance between the inlet hole receiving the inlet pipe and a first respective portion of the first coupling part at a first region of the accommodation space overlapping the corner region of the upper panel is smaller than a second distance between the inlet hole and a second respective portion of the second coupling part at a second region of the accommodation space; and
an outlet pipe coupled to the upper portion of the upper panel at a second position spaced apart from the first position.

9. The apparatus of claim 8, wherein the horizontal part connected to the inclined portions forms the accommodation space between the upper panel and the horizontal part and inclined portions.

10. The apparatus of claim 9, wherein a first length of the horizontal part is shorter than a second length of a lateral length where the inclined portions meet the first and second coupling parts at the upper panel.

11. The apparatus of claim 8, further comprising, in the first region, a backflow prevention part formed between the first respective portion of the first and second coupling parts and the inlet hole.

12. The apparatus of claim 11, wherein a third length of the backflow prevention part is less than a fourth length of a respective portion of the inclined portions in the first region.

13. The apparatus of claim 8, wherein the outlet pipe joins the upper panel at an outlet hole,
wherein the outlet hole is configured to receive a liquid introduced through the inlet pipe from the accommodation space, and
wherein the first region forms an "L" shape with the second region.

* * * * *